US008649747B1

(12) United States Patent
Emmanuel et al.

(10) Patent No.: US 8,649,747 B1
(45) Date of Patent: Feb. 11, 2014

(54) DYNAMICALLY ADJUSTING ANTENNA POLARIZATION IN A WIRELESS COMMUNICATION SYSTEM

(75) Inventors: Joseph A. Emmanuel, Cupertino, CA (US); Patrick A. Rada, San Jose, CA (US)

(73) Assignee: Netgear, Inc., San Jose, CA (US)

( * ) Notice: Subject to any disclaimer, the term of this patent is extended or adjusted under 35 U.S.C. 154(b) by 870 days.

(21) Appl. No.: 12/462,882

(22) Filed: Aug. 11, 2009

(51) Int. Cl.
*H01Q 11/12* (2006.01)
*H04B 1/04* (2006.01)

(52) U.S. Cl.
USPC ........ 455/121; 455/562.1; 455/107; 455/103; 455/69; 455/101; 455/63.4; 455/115.1

(58) Field of Classification Search
USPC ........... 455/101, 107, 103–105, 120–125, 69, 455/63.4, 115.1–115.4, 562.1
See application file for complete search history.

(56) References Cited

U.S. PATENT DOCUMENTS

| | | | |
|---|---|---|---|
| 6,243,565 B1* | 6/2001 | Smith et al. | 455/101 |
| 6,411,824 B1* | 6/2002 | Eidson | 455/561 |
| 7,136,627 B2* | 11/2006 | Hamalainen et al. | 455/101 |
| 7,408,511 B2 | 8/2008 | Liu | |
| 7,463,202 B2 | 12/2008 | Zarnowitz et al. | |
| 7,469,013 B1* | 12/2008 | Bolt et al. | 375/260 |
| 7,469,152 B2 | 12/2008 | Cetiner et al. | |
| 2003/0092402 A1* | 5/2003 | Shapira et al. | 455/101 |
| 2004/0203538 A1* | 10/2004 | Leppanen et al. | 455/101 |
| 2005/0260954 A1* | 11/2005 | Hamalainen et al. | 455/101 |
| 2006/0035608 A1* | 2/2006 | Zhang et al. | 455/129 |
| 2008/0081567 A1* | 4/2008 | Rofougaran | 455/78 |
| 2012/0064825 A1* | 3/2012 | Landon et al. | 455/39 |

OTHER PUBLICATIONS

Karasawa et al.; A Compact Tri-Polarization Antenna for MIMO Communication Systems; 2007 International URSI Commission B—Electromagnetic Theory Symposium; Jul. 26-28, 2007.
Schumacher et al.; Simulating Polarisation Diversity and Power Allocation in MIMO Channels; EPMCC 2001, Vienna, Feb. 20-22, 2001.
Dong et al.; Simulation of MIMO Channel Capacity with Antenna Polarization Diversity; IEEE, Jul. 2005, vol. 4, pp. 1869-1873.
Ali et al.; A Review on MIMO Antennas Employing Diversity Techniques; Electrical Engineering and Informatics, Indonesia Jun. 17-19, 2007; pp. 388-391.

* cited by examiner

*Primary Examiner* — Edward Urban
*Assistant Examiner* — Rui Hu
(74) *Attorney, Agent, or Firm* — Michael A. Glenn; Perkins Coie LLP

(57) ABSTRACT

A computer-implemented method for optimizing communication performance based on antenna polarization, comprising transmitting a data stream to a client device using at least one antenna structure having one or more antenna polarization, determining a need to adjust antenna polarization, selecting an antenna from the at least one antenna structure, determining an antenna polarization adjustment based on a level of communication performance of the at least one antenna structure, and dynamically making the antenna polarization adjustment for the data stream being transmitted using the selected antenna.

22 Claims, 11 Drawing Sheets

| Exemplary MIMO Antenna Polarization Adjustments for a 2 x 2 MIMO System (Page 1 of 2) | | |
|---|---|---|
| Example | AP with 2 x 2 MIMO | |
| AP - Chain - 1 | Antennas can be set to either vertical or horizontal polarizations | |
| AP - Chain - 2 | Antennas can be set to either vertical or horizontal polarizations | |
| Case - 1 | Client Antennas both in vertical polarization | |
| Case - 2 | Client Antennas both in horizontal Polarization | |
| Case - 3 | Client Antennas in Cross Polarization (1 antenna in vertical polarization and 1 antenna in horizontal polarization) | |

| Case-1 | | |
|---|---|---|
| Range | AP - Chain - 1 Antenna Polarization | AP - Chain - 2 Antenna Polarization |
| Close Range - w/o RF Frontend Overloading | Vertical Polarization | Vertical Polarization |
| Close Range - w/ RF Frontend Overloading | Horizontal Polarization | Horizontal Polarization |
| Mid Range | Vertical Polarization | Vertical Polarization |
| Long Range | Vertical Polarization | Horizontal Polarization |

| Case-2 | | |
|---|---|---|
| Range | AP - Chain - 1 Antenna Polarization | AP - Chain - 2 Antenna Polarization |
| Close Range - w/o RF Frontend Overloading | Horizontal Polarization | Horizontal Polarization |
| Close Range - w/ RF Frontend Overloading | Vertical Polarization | Vertical Polarization |
| Mid Range | Horizontal Polarization | Horizontal Polarization |
| Long Range | Horizontal Polarization | Vertical Polarization |

FIG. 7

| Exemplary MIMO Antenna Polarization Adjustments for a 2 x 2 MIMO System (Page 2 of 2) | |
|---|---|
| Case-3 - (Type - 1 with AP Chain - 1 Antenna in Vertical Polarization) | |
| Range | AP - Chain - 1 Antenna Polarization | AP - Chain - 2 Antenna Polarization |
| Close Range - w/o RF Frontend Overloading | Vertical Polarization | Horizontal Polarization |
| Close Range - w/ RF Frontend Overloading | Cross Polarization | Cross Polarization |
| Mid Range | Vertical Polarization | Horizontal Polarization |
| Long Range | Vertical Polarization | Vertical Polarization |
| Case-3 - (Type - 2 with AP Chain – 1 Antenna in Horizontal Polarization) | |
| Range | AP - Chain - 1 Antenna Polarization | AP - Chain - 2 Antenna Polarization |
| Close Range - w/o RF Frontend Overloading | Horizontal Polarization | Vertical Polarization |
| Close Range - w/ RF Frontend Overloading | Cross Polarization | Cross Polarization |
| Mid Range | Horizontal Polarization | Vertical Polarization |
| Long Range | Horizontal Polarization | Horizontal Polarization |
| Note: Assuming no polarization change in the wireless propagation medium | |

FIG. 8

| Exemplary MIMO Antenna Polarization Adjustments for 3 x 3 MIMO System (Page 1 of 2) | |
|---|---|
| Example | AP with 3 x 3 MIMO |
| AP - Chain - 1 | Antenna can be set to either vertical or horizontal polarizations |
| AP - Chain - 2 | Antenna can be set to either vertical or horizontal polarizations |
| AP - Chain - 3 | Antenna can be set to either vertical or horizontal polarizations |
| Case - 1 | Client antennas both in vertical polarization |
| Case - 2 | Client antennas both in horizontal polarization |
| Case - 3 | Client antennas in cross polarization (1 antenna in vertical and 1 antenna in horizontal polarizations) |

Case-1

| Range | AP - Chain - 1 Antenna Polarization | AP - Chain - 2 Antenna Polarization | AP - Chain - 3 Antenna Polarization |
|---|---|---|---|
| Close Range - w/o RF Frontend Overloading | Vertical Polarization | Vertical Polarization | Vertical Polarization |
| Close Range - w/ RF Frontend Overloading | Horizontal Polarization | Horizontal Polarization | Horizontal Polarization |
| Mid Range | Vertical Polarization | Vertical Polarization | Vertical Polarization |
| Long Range | Vertical Polarization | Horizontal Polarization | Vertical Polarization |

Case-2

| Range | AP - Chain - 1 Antenna Polarization | AP - Chain - 2 Antenna Polarization | AP - Chain - 3 Antenna Polarization |
|---|---|---|---|
| Close Range - w/o RF Frontend Overloading | Horizontal Polarization | Horizontal Polarization | Horizontal Polarization |
| Close Range - w/ RF Frontend Overloading | Vertical Polarization | Vertical Polarization | Vertical Polarization |
| Mid Range | Horizontal Polarization | Horizontal Polarization | Horizontal Polarization |
| Long Range | Horizontal Polarization | Vertical Polarization | Horizontal Polarization |

FIG. 9

| Exemplary MIMO Antenna Polarization Adjustments for 3 x 3 MIMO System (Page 2 of 2) | | | |
|---|---|---|---|
| Case-3 - (Type - 1 with AP Chain - 1 & 3 Antennas in Vertical Polarization) | | | |
| Range | AP - Chain – 1 Antenna Polarization | AP - Chain - 2 Antenna Polarization | AP - Chain - 3 Antenna Polarization |
| Close Range - w/o RF Frontend Overloading | Vertical Polarization | Horizontal Polarization | Vertical Polarization |
| Close Range - w/ RF Frontend Overloading | Cross Polarization | Cross Polarization | Cross Polarization |
| Mid Range | Vertical Polarization | Horizontal Polarization | Vertical Polarization |
| Long Range | Vertical Polarization | Vertical Polarization | Vertical Polarization |
| Case-3 - (Type - 2 with AP Chain - 1 & 3 Antennas in Horizontal Polarization) | | | |
| Range | AP - Chain – 1 Antenna Polarization | AP - Chain - 2 Antenna Polarization | AP - Chain - 3 Antenna Polarization |
| Close Range - w/o RF Frontend Overloading | Horizontal Polarization | Vertical Polarization | Horizontal Polarization |
| Close Range - w/ RF Frontend Overloading | Cross Polarization | Cross Polarization | Cross Polarization |
| Mid Range | Horizontal Polarization | Vertical Polarization | Horizontal Polarization |
| Long Range | Horizontal Polarization | Horizontal Polarization | Horizontal Polarization |
| Note: Assuming no polarization change in the wireless propagation medium | | | |

FIG. 10

DYNAMICALLY ADJUSTING ANTENNA POLARIZATION IN A WIRELESS COMMUNICATION SYSTEM

BACKGROUND

MIMO (multiple input, multiple output) is a wireless communication scheme in which multiple antennas and transceivers are used to increase the reliability of data transmission. Data from different communication chains at each end of a communications circuit are combined to minimize errors and optimize data speed. Other types of wireless communication schemes include MISO (multiple input, single output) and SIMO (single input, multiple output).

In conventional wireless communications, a single antenna is used at the transmitter and another single antenna is used at the receiver (e.g., single input, single output or a SISO system). In some cases, this gives rise to problems with multipath effects. For example, when an electromagnetic wave hits obstacles such as hills, canyons, buildings, utility wires, and/or walls or furniture in an indoor environment, the wavefronts are scattered, and thus may take many paths to reach the destination. The late arrival of scattered portions of the signal may cause problems such as fading, cut-out (i.e., cliff effect), and/or intermittent reception. In digital communications systems such as wireless Internet, these problems can cause a reduction in data speed and an increase in the number of errors. The use of two or more antennas, along with the transmission of multiple signals (one for each antenna) at the transmitter and the receiver, may reduce the problems caused by multi-path wave propagation.

Data in a MIMO system can be sent by a single or multiple streams. In a single stream, the same data are sent through multiple transceiver chains. When data are sent by multiple streams, data are divided into data packets and sent through different transceiver chains. In general, the capacity of a MIMO system increases linearly as the number of transceiver chains increase. One of the important concerns in designing a MIMO system includes reducing signal correlation between two or more transceiver chains.

One solution addressing this concern can be referred to as polarization diversity. Polarization is a property of waves that describes the orientation of their oscillations. Polarization diversity generally involves implementing antennas having different polarizations at the transmitter. An antenna may be configured to have any one of vertical, horizontal, cross, or left or right handed circular polarization. During data transmission, especially when the transmitter and receiver are far apart, a matching antenna polarization at both ends is generally optimal for data transmission. Existing wireless communication systems employing antenna polarization diversity typically implement multiple antennas at the transmitter in varied but fixed polarizations. The fixed antenna polarizations generally cannot be adjusted during transmission of a data stream.

Thus, a market exists for a wireless communication system that is enabled to dynamically adjust antenna polarization during data transmission.

SUMMARY

A computer-implemented method for optimizing communication performance based on antenna polarization, comprising transmitting a data stream to a client device using at least one antenna structure having one or more antenna polarization, determining a need to adjust antenna polarization, selecting an antenna from the at least one antenna structure, determining an antenna polarization adjustment based on a level of communication performance of the at least one antenna structure, and dynamically making the antenna polarization adjustment for the data stream being transmitted using the selected antenna.

Other exemplary embodiments and implementations are disclosed herein.

BRIEF DESCRIPTION OF THE FIGURES

FIGS. 7-8 illustrate exemplary antenna polarization adjustments for a 2×2 MIMO system.

FIGS. 9-10 illustrate exemplary antenna polarization adjustments for a 3×3 MIMO system.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

I. Overview

Section II describes an exemplary MIMO communication system for transmitting and receiving data.

Section III describes exemplary processes for dynamically adjusting antenna polarizations during data transmission.

Section IV describes an exemplary computing environment.

II. An Exemplary MIMO Communication System

Figure 1:
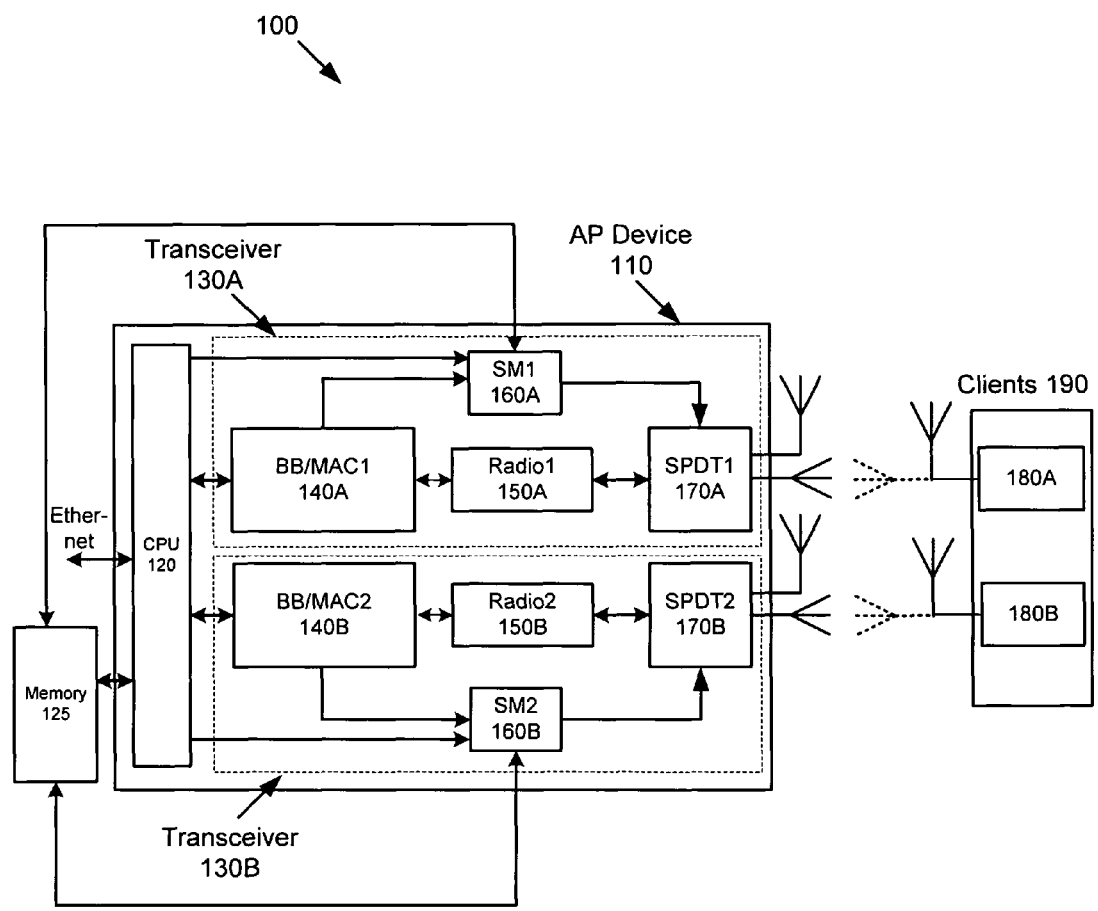
FIG. 1 illustrates an exemplary MIMO communication system for transmitting and receiving data.

FIG. 1 illustrates an exemplary MIMO communication system 100 for transmitting data from an access point device (AP device) 110 to one or more clients 190. The AP device 110 includes two transceivers 130A and 130B and the clients 190 include two transceivers 180A and 180B (i.e., client devices). One skilled in the art will recognize that the system 100 is an exemplary 2×2 MIMO system (i.e., 2 transceivers at the AP device 110 and 2 transceivers at the clients 190). One skilled in the art will also recognize that more or fewer transceivers 130 may be implemented in an AP device 110 and more or fewer client transceivers (or devices) may be implemented to form other types of communication systems (e.g., a MIMO system with more or fewer AP devices/clients, a SISO system, a MISO system, or a SIMO system). The AP device 110 is representative of a router, a bridge, and/or other data transmitting and receiving devices.

The AP device 110 further includes a CPU 120 for controlling the transceivers 130A and 130B and a memory 125 for storing communication history and other information. In an exemplary implementation, the transceiver 130A includes a base band station and a media access control (BB/MAC1) 140A, a radio 150A, a state machine 160A, and a single-pole-double-throw (SPDT) switch 170A controlling one or more antennas. Similarly, the transceiver 130B includes a base band station and a media access control (BB/MAC2) 140B, a radio 150B, a state machine 160B, and a SPDT switch 170B controlling one or more antennas. The BB/MAC 140 and the radio 150 are components typical in a data transmitting and receiving device, such as an AP device 110, and need not be described in more detail herein. The state machine 160 receives input from the CPU 120, BB/MAC 140, and memory 125. An exemplary state machine 160 will be described in more detail with reference to FIG. 3. An exemplary implementation of an SPDT switch 170 will be described in more detail with reference to FIG. 11.

The clients 190 include a transceiver 180A for client device A and a transceiver 180B for client device B. Each transceiver includes at least one antenna. For ease of explanation purposes, other components of the clients 190 are not illustrated and the terms "client" and "client device" will be used interchangeably in this patent. For example, a typical client device may further include a processor for processing and responding to signals received from the AP device 110.

Figure 2:
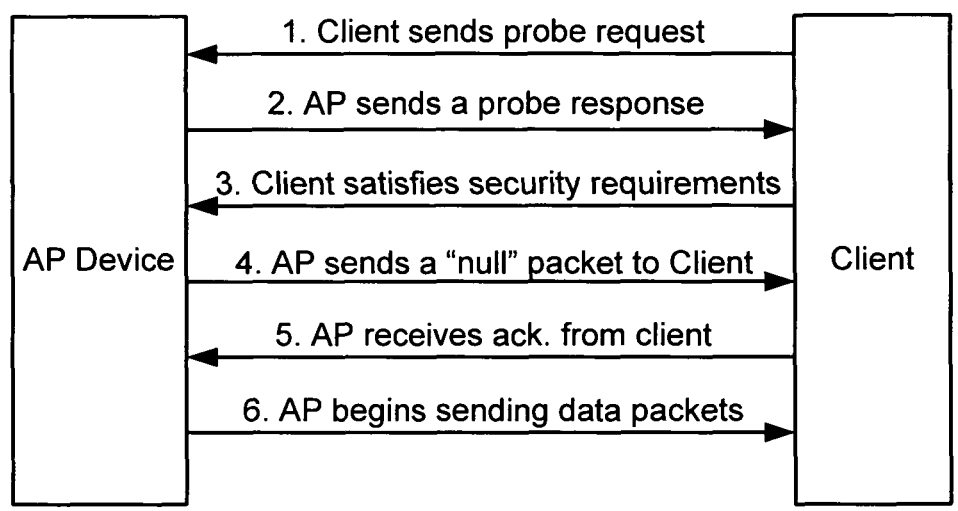
FIG. 2 illustrates an exemplary initiation of a communication session between an AP device and a client device of the system of FIG. 1.

FIG. 2 illustrates an exemplary initiation of a wireless communication session between an AP device 110 and a client 190. A client 190 typically initiates a communication session by sending a probe request to an AP device 110. In response to receiving the probe request, the AP device 110 sends a probe response to the client 190. The probe response may include the identification of the standard(s) supported by the AP device 110 and any security requirements for accessing the AP device 110. If security requirements are indicated, the client 190 then sends security data satisfying the requirements. Next, the AP device 110 typically sends to the client 190 a "null" packet which is a digital communication packet that does not include substantive data. The AP device 110 receives an acknowledgement from the client 190 indicating the receipt of the null packet. Typically, the acknowledgement is received by the BB/MAC 140 of the AP device 110. The BB/MAC 140 is configured to parse the acknowledgement and output information that can be used to determine communication link quality. The information may include, without limitation, one or more of data rate, stream control, MAC retries, received-signal-strength-indication (RSSI), quality of service (QoS), other real-time link quality information, history-based link quality information, number of MIMO data streams, and/or other information. Lastly, the AP device 110 begins sending data packets to the client 190. During a communication session, the AP device 110 may or may not use some or all the information in the null packet to adjust data rate and/or make other communication link adjustments. In an exemplary implementation, one of the communication link adjustments is an adjustment of an antenna polarization at the AP device 110 prior to transmitting a first data packet and/or dynamically during the transmission of a data stream (e.g., on a packet-by-packet basis).

Figure 3:
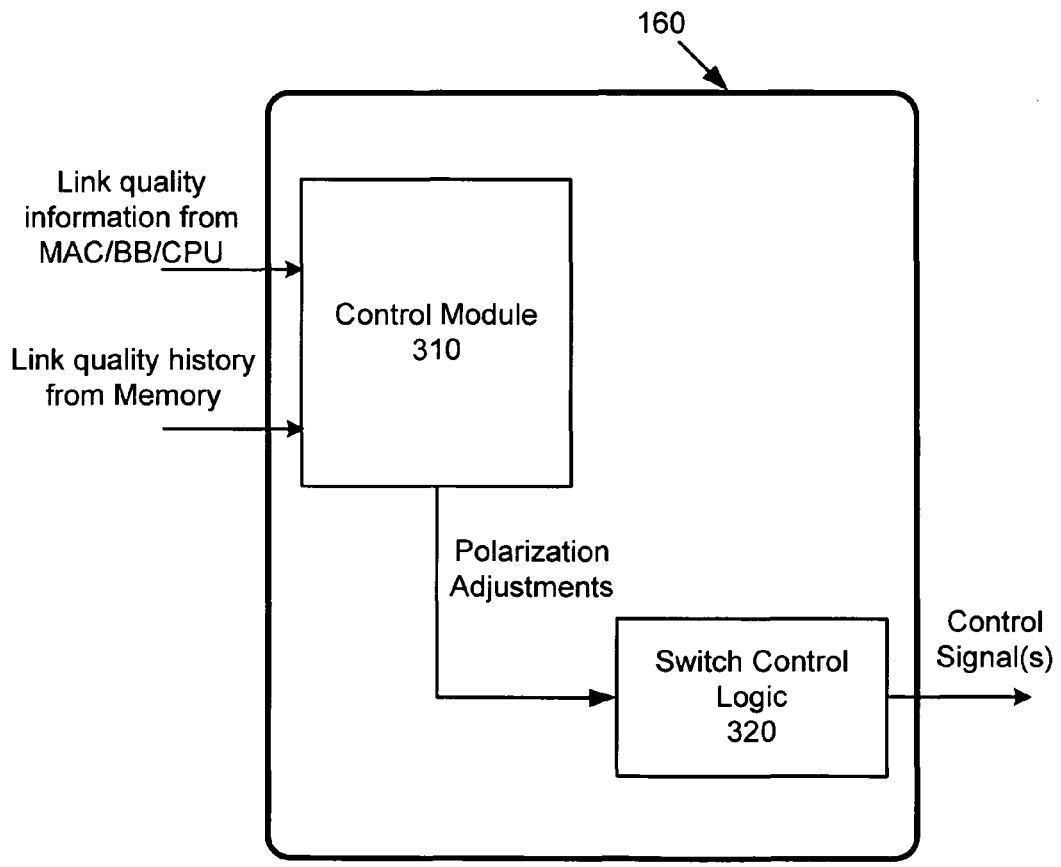
FIG. 3 illustrates an exemplary state machine for determining automatic polarization adjustments in the system of FIG. 1.

FIG. 3 illustrates an exemplary state machine 160. The state machine 160 may be implemented as a part of a transceiver 130 as illustrated in FIG. 1 or may be implemented outside of the transceiver 130 (not shown).

In an exemplary implementation, the state machine 160 includes a control module 310 and antenna switch control logic 320. The control module 310 receives input from one or more of the BB/MAC 140, CPU 120, and/or memory 125. Each of these components may provide one or more link quality information. Link quality information includes, without limitation, data rate, stream control, MAC retries, received-signal-strength-indication (RSSI), quality of service (QoS), other real-time link quality information, history-based link quality information, number of MIMO data streams, and/or other information. The control module 310 may use some or all of the link quality information to determine what type of antenna adjustments should be made, if at all, to further improve communication performance. Any adjustment determination made by the control module 310 is executed by the switch control logic 320 which generates and sends a control signal to the SPDT switch 170 in its communication chain. A communication chain typically comprises a transceiver 130 having one or more antenna. A state machine 160 may be configured to control one or more communication chains.

Depending on design choice, the control module 310 may be configured to make polarization adjustment determinations on a "fast," "medium," or "slow" control speeds. One skilled in the art will recognize that the labels for these control speeds (i.e., fast, medium and slow) are merely illustrative. In other words, control module 310 can be configured to make polarization adjustment determinations at any speed depending on design choice.

A fast control speed is performed on a packet-by-packet basis. In an exemplary implementation, the control module 310 is configured to use link quality information in a null packet to determine any initial adjustments prior to sending the first data packet. In a fast control speed configuration, the control module 310 typically considers a single or a select few of the different types of link quality information (e.g., MAC retries and RSSI). A fast control speed may be desirable for data streams that require "fast" processing (e.g., video games, voice over IP, etc.).

A medium control speed is slower than a packet-by-packet processing speed (e.g., every few data packets). Although some data may be lost and may need to be resent, the medium speed enables the control module 310 to consider more types of link quality information. A medium control speed may be desirable for data streams that require "medium" processing (e.g., buffered video, etc.).

A slow control speed is slower than a medium control speed (e.g., many data packets). Although many data packets may be lost and may need to be resent, the slow speed enables the control module 310 to consider many types of link quality information. A slow control speed is desirable for data streams that can tolerate "slow" processing (e.g., general data).

The different processing speeds may be dynamically configured depending on data type, history of data communication by an AP device, client history, and/or other factors depending on design choice. For example, one reason for selecting a slower control speed is to conserve processing power in the system.

Figure 4:
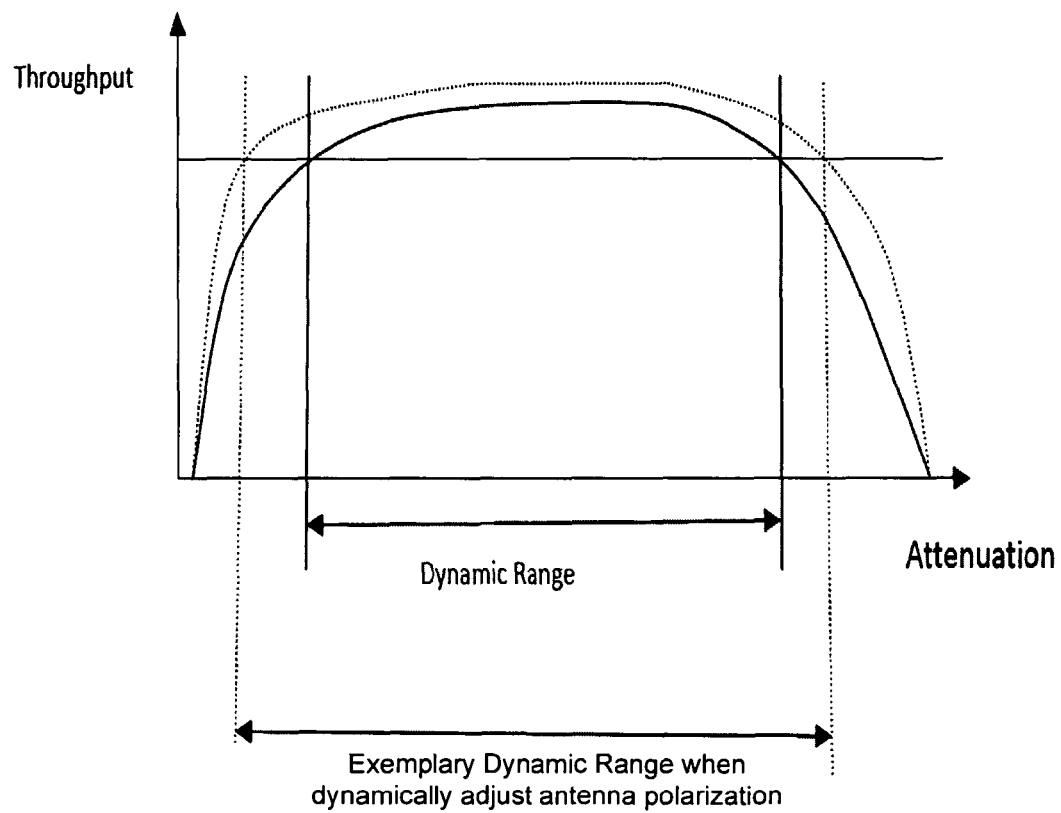
FIG. 4 illustrates an exemplary representation of a dynamic range during a communication session.

In an exemplary implementation, a polarization adjustment determined by the state machine 160 is also based on whether the signal strength will remain within a desired dynamic range for a given type of data being transmitted. In a transmission system, the dynamic range is the ratio of the overload level (i.e., the maximum signal power that the system can tolerate without distortion of the signal) to the noise level of the system. FIG. 4 illustrates an exemplary representation of a dynamic range for transmitting data packets. Typically, a matching polarization between the transmitter and receiver antennas is optimal. However, in close range situations where the transmitter and receiver are near each other (e.g., within 10 meters), matching polarizations at both ends may actually saturate the receiver and fall outside the dynamic range. As a result, the control module 310 may, in certain situations, determine that a polarization adjustment that effects mismatching polarizations on the transmitter and receiver ends is desirable.

Figure 11:
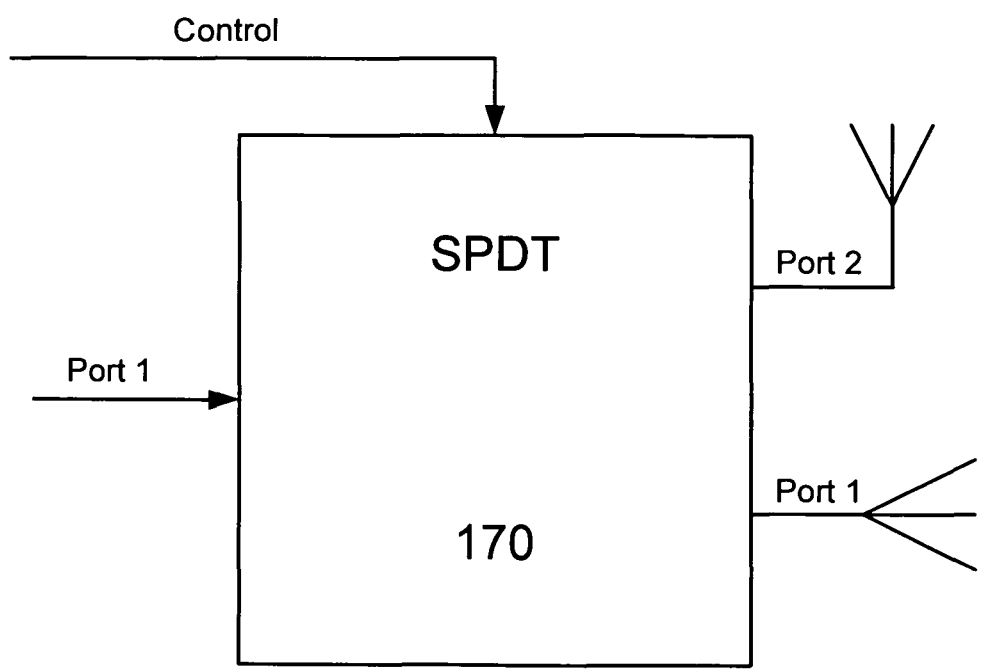
FIG. 11 illustrates an exemplary SPDT switch.

FIG. 11 illustrates an exemplary SPDT switch 170. In an exemplary implementation, the SPDT switch 170 controls two antennas: a first antenna having a vertical polarization at port 2 and a second antenna having a horizontal polarization at port 3. In general, if port 1 of the SPDT switch 170 is connected to port 2, the first antenna is chosen and if port 1 is instead connected to port 3, the second antenna is chosen. Port connectivity can be configured to respond to control signals from the state machine 160. In an exemplary implementation, the SPDT switch 170 is further configured to have a third control option where port 1 may connect to both port 2 and port 3 in response to a control signal from the state machine 160. When port 1 is connected to both ports 2 and 3, a cross polarized mode is effected. A cross polarized mode generally reduces output power and may reduce or prevent signal saturation in close range situations where the transmitter and receiver are near each other (e.g., as a result of a polarization mismatch between the transmitter and receiver ends). A person skilled in the art will recognize that a cross polarized mode may be effected in other situations depending on specific implementations.

III. Exemplary Processes for Dynamically Adjusting Antenna Polarization

Figure 5:
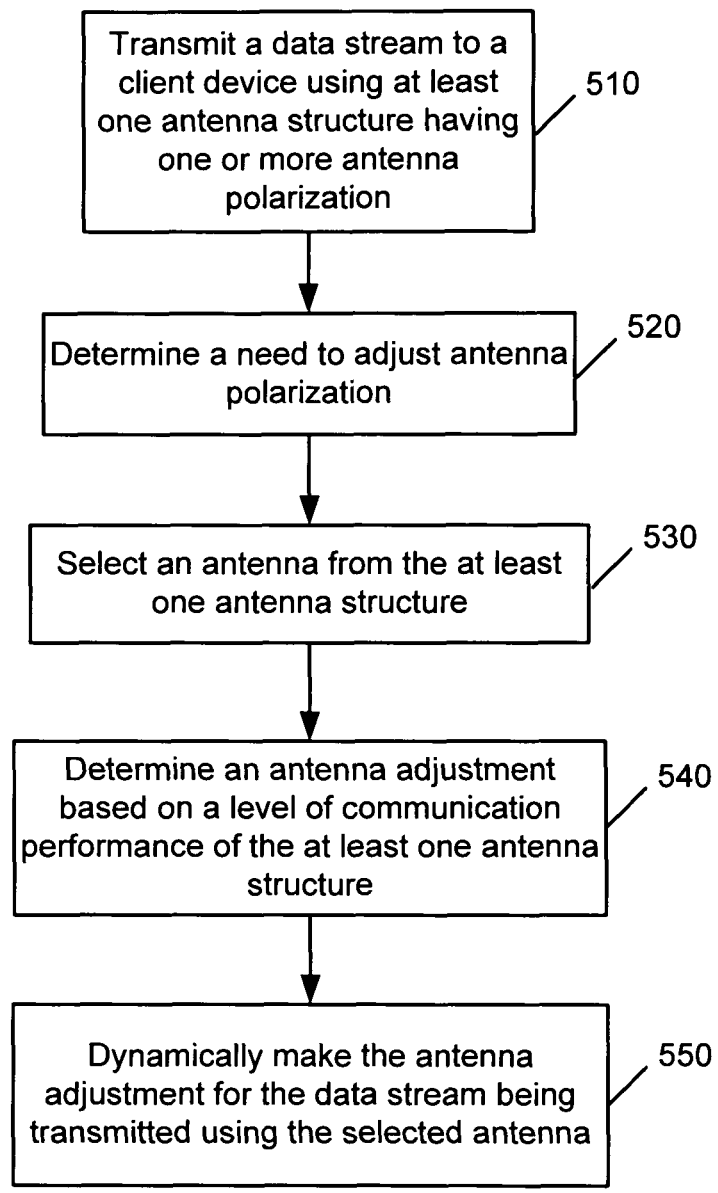
FIG. 5 illustrates an exemplary process for optimizing communication performance based on antenna polarization diversity.

FIG. 5 illustrates an exemplary process for optimizing communication performance based on antenna polarization diversity.

At step 510, an AP device 110 transmits a data stream to a client 190 using at least one antenna structure having one or more antenna polarization. In an exemplary implementation, an antenna may be configured to have multiple polarizations. In addition to polarization diversity, different other types of antenna diversity may also be implemented to transmit the data stream (e.g., antenna number diversity, time, frequency, space, and/or spatial diversity).

At step 520, the AP device 110 determines a need to adjust antenna polarization. In an exemplary implementation, one or more factors may be considered to determine whether there is a need to adjust antenna polarization. Exemplary factors include, without limitation, whether the signal strength is outside the dynamic range, how long the signal strength has been outside the dynamic range, transmission data rate, transmission condition, and/or other factors.

At step 530, the AP device 110 selects an antenna from the at least one antenna structure. Depending on specific implementation, the selection may be performed in an orderly, random, or pseudo random fashion and may be based on one or more of a policy, a last adjustment, a performance history, and/or other factors.

At step 540, the AP device 110 determines an antenna adjustment based on a level of communication performance of the at least one antenna structure. In an exemplary implementation, the state machine 160 in the communication chain of the selected antenna makes the determination as described above with reference to FIG. 3. An exemplary process performed by a state machine 160 is described in more detail below with reference to FIG. 6. In an exemplary implementation, the level of communication performance is based on one or more types of the link quality information and is compared to a reference. The reference may be one or more of a set of conditions, a threshold, history, hysteresis, the dynamic range, a physical range between the transmitter and the receiver, and/or other references depending on design choice. Depending on the level of communication performance, the polarization adjustment may be determined to effect either matching or mismatching polarizations between the transmitter and the receiver ends. For example, if the transmitter and receiver are far apart from each other (i.e., in a long range situation), the polarization adjustment is likely to effect a matching polarization at both ends. On the other hand, if the transmitter and receiver are near each other (i.e., in a close range situation), the polarization adjustment is likely to effect mismatching polarizations at both ends to correct any signal saturation.

Exemplary polarization adjustments for a 2×2 MIMO system are illustrated in FIGS. 7-8. Exemplary polarization adjustments for a 3×3 MIMO system are illustrated in FIGS. 9-10. These figures will be described in more detail below. Persons skilled in the art will recognize that these examples are merely illustrative.

At step 550, the AP device 110 dynamically make the antenna adjustment for the data stream being transmitted using the selected antenna. In an exemplary implementation, the state machine 160 is configured to provide adjustment instructions to a responsible switch controlling the selected antenna. An exemplary process performed by the state machine 160 is described in more detail below with reference to FIG. 6. The antenna adjustment may be made on a fast, medium or slow control speed depending on configuration and design choice.

Figure 6:
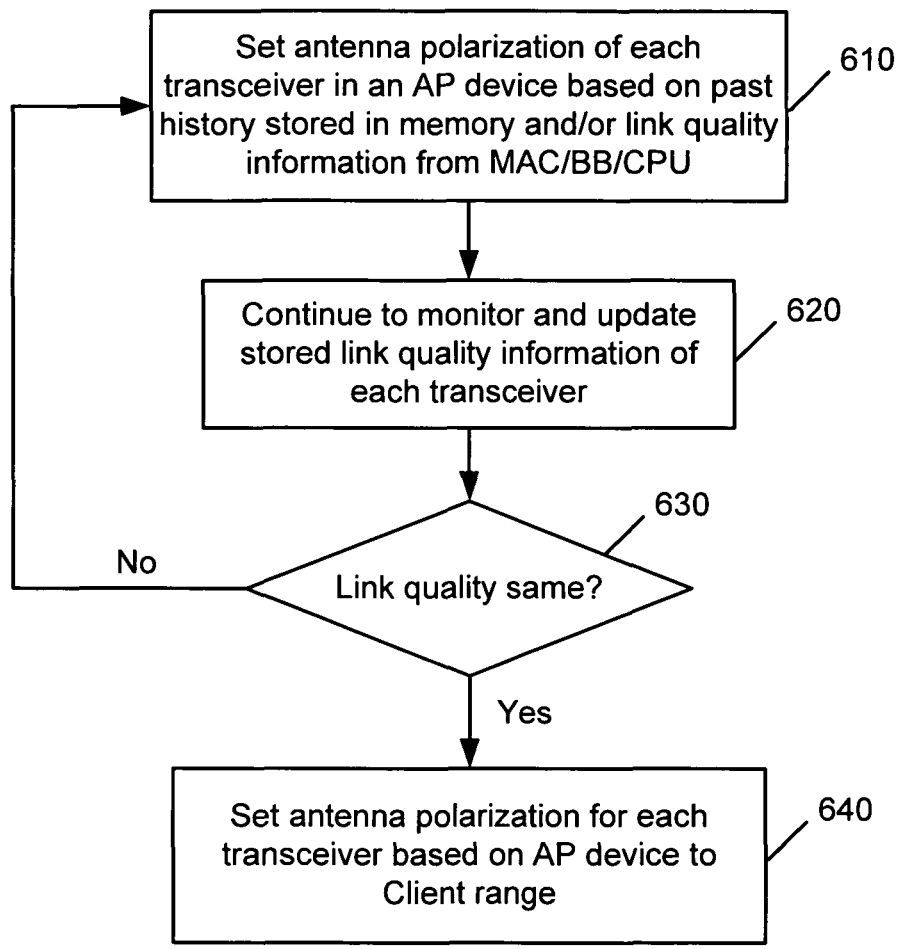
FIG. 6 illustrates an exemplary process for determining antenna polarization adjustments.

FIG. 6 illustrates an exemplary process performed by a state machine 160 for determining antenna polarization adjustments.

At step 610, the state machine 160 sets antenna polarization of each transceiver 130 in an AP device 110 based on past history stored in memory 125 and/or link quality information from the BB/MAC 140 and/or the CPU 120.

At step 620, the state machine 160 continues to monitor and update stored link quality information of each transceiver 130.

At step 630, the state machine 160 determines whether the link quality has remained the same. If so, at step 640, the state machine 160 sets antenna polarization for each transceiver based on a physical range between the AP device 110 and the client 190.

Referring back to step 630, if the link quality has changed, the process repeats at step 610.

FIGS. 7-8 illustrate exemplary polarization adjustments for a 2×2 MIMO system. Specifically, FIG. 7 illustrates exemplary polarization adjustments of one or more antennas of an AP device 110 in a 2×2 MIMO system in two cases: (1) Case 1 where the client antennas are both in vertical polarization; and (2) Case 2 where the client antennas are both in horizontal polarization. FIG. 8 illustrates exemplary polarization adjustments of one or more antennas of an AP device 110 in a 2×2 MIMO system in two types of Case 3 where the client antennas are in cross polarization: (1) Type 1 where one client antenna is in vertical polarization; and (2) Type 2 where one client antenna is in horizontal polarization. Note that in Case 3 when the client antennas are in cross polarized mode, selecting a cross polarized mode on the AP device side can reduce output power and signal saturation in close range situations.

FIGS. 9-10 illustrate exemplary polarization adjustments for a 3×3 MIMO system. Specifically, FIG. 9 illustrates exemplary polarization adjustments of one or more antennas of an AP device 110 in a 3×3 MIMO system in two cases: (1) Case 1 where the client antennas are both in vertical polarization; and (2) Case 2 where the client antennas are both in horizontal polarization. FIG. 10 illustrates exemplary polarization adjustments of one or more antennas of an AP device 110 in a 3×3 MIMO system in two types of Case 3 where the client antennas are in cross polarization: (1) Type 1 where two client antennas are in vertical polarization; and (2) Type 2 where two client antennas are in horizontal polarization.

One skilled in the art will recognize that the exemplary polarization adjustments in FIGS. 7-10 are merely illustrative. Other combinations of adjustments may be made depending on the number or type of link quality information being taken into consideration. Furthermore, polarization adjustments may be determined for other types of m×n systems.

IV. Exemplary Operating Environments

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A computer-implemented method for optimizing communication performance based on antenna polarization, comprising:
    transmitting with a transmitter a data stream to a client device using at least one antenna structure having more than one antenna polarization;
    determining a need to adjust antenna polarization based on a level of communication performance, wherein said level of communication performance is based at least on a physical range between said transmitter and said client device;
    selecting an antenna from the at least one antenna structure;
    determining an antenna polarization adjustment based on said level of communication performance of the at least one antenna structure; and
    dynamically adjusting the polarization of the selected antenna for the data stream being transmitted relative to polarization of said client device antenna in accordance with at least said level of communication performance;
    wherein if said transmitter and said client device are far apart from each other in a long physical range situation, a polarization adjustment is made to effect a matching polarization between both said transmitter and said client device; and
    wherein if said transmitter and said client device are near each other in a close physical range situation, a polarization adjustment is made to effect mismatching polarizations between both said transmitter and said client device.

2. The computer-implemented method of claim 1, wherein the data stream is being transmitted in a SISO communication system.

3. The computer-implemented method of claim 1, wherein the data stream is being transmitted in a MIMO communication system.

4. The computer-implemented method of claim 1, wherein the data stream is being transmitted in a MISO communication system.

5. The computer-implemented method of claim 1, wherein said need to adjust is based on a feedback from said client device.

6. The computer-implemented method of claim 5, wherein said feedback includes link quality information.

7. The computer-implemented method of claim 1, wherein said at least one antenna structure includes an antenna configured to have multiple polarizations.

8. The computer-implemented method of claim 1, wherein said level of communication performance is compared to a reference.

9. The computer-implemented method of claim 1, wherein said level of communication performance is based on one or more types of link quality information.

10. The computer-implemented method of claim 1, wherein said adjustment is repeated until said data stream is transmitted within a dynamic range.

11. The computer-implemented method of claim 1, wherein said adjustment is made on a packet-by-packet basis.

12. An access point device configured for optimizing communication performance based on antenna polarization, comprising:
    a transmitter controlling one or more antennas;
    a state machine coupled to said transmitter, said state machine having a control module and switch control logic; said control module being configured to:
        transmit a data stream to a client device using at least one antenna structure of said transmitter having more than one antenna polarization;
        determine a need to adjust antenna polarization based on a level of communication performance, wherein said level of communication performance is based at least on a physical range between said transmitter and said client device;
        select an antenna from the at least one antenna structure;
        determine an antenna polarization adjustment based on said level of communication performance of the at least one antenna structure; and
    enabling said switch control logic to dynamically generate a control signal for adjusting the polarization of the selected antenna for the data stream being transmitted relative to polarization of said client device antenna in accordance with at least said level of communication performance;
    wherein if said transmitter and said client device are far apart from each other in a long physical range situation, a polarization adjustment is made to effect a matching polarization between both said transmitter and said client device; and wherein if said transmitter and said client device are near each other in a close physical range situation, a polarization adjustment is made to effect mismatching polarizations between both said transmitter and said client device.

13. The device of claim 12, wherein said need to adjust is based on a feedback from said client device.

14. The device of claim 13, wherein said feedback includes link quality information.

15. The device of claim 12, wherein said level of communication performance is compared to a reference.

16. The device of claim 12, wherein said level of communication performance is based on one or more types of link quality information.

17. The device of claim 12, wherein said adjustment is made on a packet-by-packet basis.

18. A non-transitory computer-readable medium embodied with logic instructions executable by a computing device for optimizing communication performance based on antenna polarization, said logic instructions, when executed:

transmit a data stream to a client device using at least one antenna structure having more than one antenna polarization;

determine a need to adjust antenna polarization based on a level of communication performance, wherein said level of communication performance is based at least on a physical range between said transmitter and said client device;

select an antenna from the at least one antenna structure;

determine an antenna polarization adjustment based on said level of communication performance of the at least one antenna structure; and dynamically adjust the polarization of the selected antenna for the data stream being transmitted relative to polarization of said client device antenna in accordance with at least said level of communication performance;

wherein if said transmitter and said client device are far apart from each other in a long physical range situation, a polarization adjustment is made to effect a matching polarization between both said transmitter and said client device; and wherein if said transmitter and said client device are near each other in a close physical range situation, a polarization adjustment is made to effect mismatching polarizations between both said transmitter and said client device.

19. The computer-readable medium of claim 18, wherein said need to adjust is based on a feedback from said client device.

20. The computer-readable medium of claim 18, wherein said level of communication performance is compared to a reference.

21. The computer-readable medium of claim 18, wherein said level of communication performance is based on one or more types of link quality information.

22. The computer-readable medium of claim 18, wherein said adjustment is made on a packet-by-packet basis.

* * * * *